N. POWER.
SAFETY DEVICE FOR MOTION PICTURE MACHINES.
APPLICATION FILED FEB. 18, 1913.
1,210,203.
Patented Dec. 26, 1916.
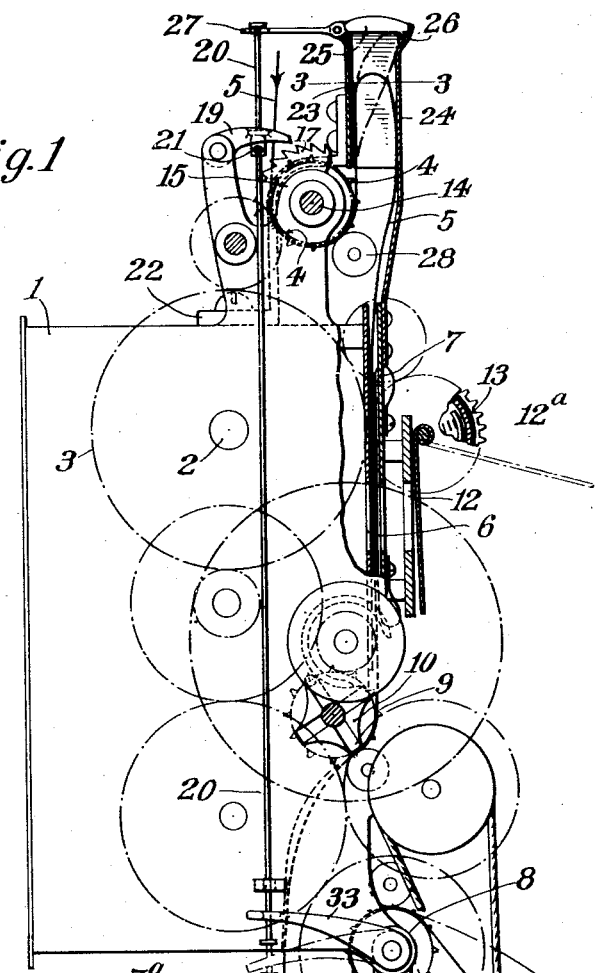
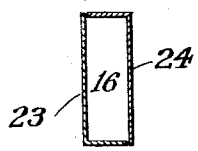
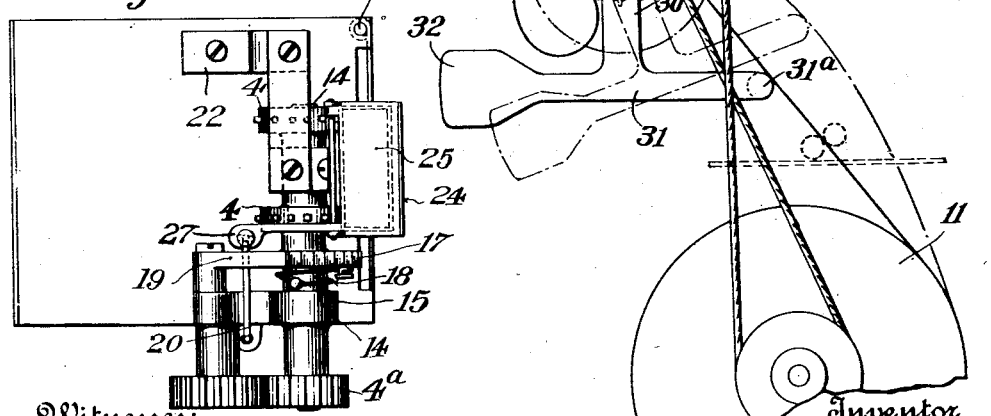

UNITED STATES PATENT OFFICE.

NICHOLAS POWER, OF BROOKLYN, NEW YORK, ASSIGNOR TO NICHOLAS POWER COMPANY, OF NEW YORK, N. Y., A CORPORATION OF DELAWARE.

SAFETY DEVICE FOR MOTION-PICTURE MACHINES.

1,210,203.  Specification of Letters Patent.  Patented Dec. 26, 1916.

Application filed February 18, 1913. Serial No. 749,238.

*To all whom it may concern:*

Be it known that I, NICHOLAS POWER, a citizen of the United States, and resident of Brooklyn, in the county of Kings and State of New York, have invented certain new and useful Improvements in Safety Devices for Motion-Picture Machines, of which the following is a specification.

This invention relates to safety devices for motion picture projecting machines, and particularly to mechanism for eliminating the chief causes of the film catching fire.

In motion picture projecting machines, as now almost universally constructed, the essential elements consist of a lamp and lenses for projecting the picture, a frame having an aperture corresponding in size with the individual pictures on the film strip, a shutter for periodically cutting off the light between the lens and the screen, and a feed mechanism acting during such period to intermittently feed the successive pictures into registration with the projection aperture. The lamps employed in such apparatus are usually powerful arc lamps or other intense lights, sufficient when concentrated upon the same portion of the film for any appreciable time to cause the same to ignite and perhaps cause a serious accident, for even though the fire may be extinguished before material damage is done, the smell of the burning film in the theater and the momentary projection on the screen of the image of the fire not infrequently causes a panic among the spectators. To prevent such ignition when the machine is not in operation, most machines are provided with a door or "fire shield" hinged above the projection aperture and connected with the driving mechanism so as to close the aperture the moment rotation of the driving shaft ceases. It sometimes happens however, particularly with previously used, worn, or spliced films, that the film will remain stationary with the same portion over the aperture long enough to be heated to the point of ignition, although the operator may continue operating the mechanism in the usual manner, thereby keeping the fire shield open. After the film passes the intermittent feed device it is fed to a reel in a receiving magazine driven through a tension device to tightly wind the film. If for any reason the reel driving mechanism fails to operate, as for instance through the breaking of the driving belt, the film will quickly pile up between the machine and the magazine, where it may be caught in the gearing of the machine or otherwise damaged.

The objects of my present invention are to provide means operating automatically on the breaking of the film, the failure of the feed mechanism, or from any other cause of the films remaining stationary for an abnormal length of time, or upon failure of the winding mechanism, to cut off the light from the projection aperture by stopping the machine thereby preventing the film igniting or being otherwise damaged.

In the embodiment of my invention illustrated in the accompanying drawings, and described in the following specification, I accomplish this result by the provision of a novel stop mechanism operated by an accumulation of the film between the upper continuously operating sprocket to stop the entire machine so the fire shield will close in the normal manner, but the result may be accomplished by stopping merely the portion of the machine which controls the fire shield or by operating the present fire shield without stopping the machine at all, so that the picture will be cut off and the operator notified to correct the defect wherever it occurs, and it is to be understood that my invention is not limited to the construction here shown. So far as I am aware I am the first to provide mechanism of any kind in a motion picture machine to eliminate the defects noted, and the appended claims are to be construed broadly in accordance with the spirit of the law.

In the accompanying drawings, Figure 1 is a vertical section through the head of a motion picture machine equipped with my improved stop mechanism. Fig. 2 is a plan view of a portion of the mechanism shown in Fig. 1. Fig. 3 is a detail view which will be later described.

Referring now to the drawings in which like characters indicate like parts throughout the several views, 1 indicates the frame of the machine in which is mounted as shown diagrammatically in Fig. 1 the main driving shaft 2 to which is connected the usual operating handle, not shown. Attached to the shaft 2 is the main driving gear 3 from which is continuously driven by suitable intermediate gears, a first or upper feed sprocket 4 for the film 5. The film passes downward and past the projection aperture 6 in the frame, between the guide springs carried by the door 7 hinged to the frame at 7ª and the rear wall of the head to the intermittently operated sprocket 9. This sprocket is operated from the shaft 2 by means of suitable gearing including a Geneva or other intermittent movement 10 at a speed such that the length of film normally fed intermittently by the sprocket 9 is equal to the length fed continuously by the sprocket 4 in the same interval. Beneath the sprocket 9 there is provided a lower continuously driven sprocket 8 for feeding the film to the take up reel 11, this sprocket being driven by suitable gears in synchronism with the sprocket 4 so that the film may be threaded in the machine with suitable loops or slack between the several sprockets and such loops will be maintained as long as there is no slip of the film on any of the sprockets or other interruption to the normal feed.

In Fig. 1 I have shown in full lines at 12 and in dotted lines at 12ª the two positions of the fire shield when the machine is stopped and when it is in motion respectively. Any of the improved mechanism now in use for this purpose may be employed with the stop mechanism I have illustrated, for instance the centrifugal clutch 13 on the spindle of the shield driven from the main shaft 2 through a suitable idler.

It will be understood that all the gears described are on the side of the machine shown in the drawing but are merely indicated in dot and dash lines to show the parts behind the gears.

The mechanism so far described constitutes essential elements of a motion picture machine of ordinary construction, and I will now describe the construction and operation of my improved stop mechanism as applied to it.

The upper sprocket 4 is fast to a spindle 14 which is rotatably mounted in a bearing 15 in the frame 1 and projects beyond the same to receive the driving gear 4ª. A ratchet wheel 17 is loosely mounted on the shaft between the gear and the bearing 15 and has attached to its face a coil spring 18 having its other end connected to the spindle 14. Pivoted to the frame in position to engage the ratchet wheel is a pawl 19 having an ear on one side through which passes a rod 20 provided with a collar 21 engaging the under surface of the pawl to normally hold it out of engagement with the ratchet as will now be described. Attached to the upper surface of the head 1 is a bracket 22 to which is attached a sheet metal plate 23 having one side bent at right angles thereto as shown in Fig. 3 forming two sides of a rectangular tube 16, the other two sides of which are formed at the upper end of a piece of sheet metal 24 attached to the upper edge of the door 7. Hinged to the top edge of the piece 23 is a weighted lid 25 having at its free edge a lip 26 which projects slightly down into the tube, the piece 24 being curved outwardly at the top for a purpose to be later described. An arm 27 projects rearwardly from the hinged side of the lid 25 and is provided at its free end with a slot through which the rod 20 projects, the rod having a head overlying the arm 27 whereby the weight of the lid 25 holds the pawl 19 out of engagement with its ratchets. The film on leaving the sprocket 4 is directed upwardly into the tube 16 by a roller 28. It then bends downwardly against the piece 24 forming a loop whose normal position is shown in Fig. 1 in solid lines. As long as the machine is in operation the intermittent sprocket feeds the film away as fast as it is fed into the tube so that the size of the loop will vary only by the length of one picture on the film strip.

Suppose the film being exhibited contains a defective splice, such a splice if it holds together sufficiently to be wound on the reel will usually pass the sprocket 4 without separating, for the pull of this sprocket is uniform and the resistance offered by the film is slight. When however the splice reaches the projection aperture its double thickness beneath the springs on the door 7 offers such resistance that the sudden pull of the intermittent feed not infrequently causes the splice to part leaving the end of the film in the path of the intense light and heat of the lamp. The moment however the advanced end of the film stops, the loop in the film projecting into the tube 16 enlarges and being confined in the tube 16 rises in the tube, thereby raising the weighted lid 25 and permitting the pawl 19 to drop into engagement with the ratchet wheel, stopping the rotation of the ratchet wheel and opposing the resistance of the spring 18 to the further rotation of the spindle 13, thereby stopping the machine without shock or jar and allowing the fire shield to close in the usual manner before the heat from the lamp can possibly ignite the film.

Another common defect in used films is the destruction of the sprocket holes in the margins of the film. A film so mutilated will have sufficient frictional engagement with the sprocket 4 to be fed by it but will slip on the intermittent sprocket leaving the film stationary at the projection aperture where it would shortly ignite if the stop mechanism did not operate as described to permit the fire shield to close. Should the film break in the loop within the tube 16 the advancing end from the sprocket 4 would tend to pass out between the lid 25 and the piece 24 without raising the lid sufficiently to stop the machine. To prevent this the lip 26 is provided and the piece 24 curved as shown to deflect the end of the film toward the piece 23 as shown in dotted lines where it will engage the roller 28, forming a loop which will raise the lid 25.

The rod 20 is bent outwardly below the pawl 19 to clear the bracket of the spindle 14 and thence extends downwardly along the wall of the head to a point to the rear of the lower continuous sprocket 8. Pivoted freely on the bearing of this sprocket at one end is a depending arm 30 having a horizontal piece 31 which is provided at one end with a transverse rod 31ª engaging the under face of the film between the sprocket 8 and the guide rollers of the magazine indicated in dotted lines in Fig. 1. The arm 30 is provided with a projecting arm 33 having a slot in its end through which the rod 20 projects, the rod having a button on its end underlying the arm 33. The end of the horizontal piece 31 beneath the rod 20 is weighted as shown at 32 so that the arm 30 tends to swing to the right under the action of gravity but is held in the position shown in full lines by the engagement of the rod 31ª engaging the film. When however the reel 11 stops or if for any other reason the film becomes slack beyond the sprocket 8 the weight 32 will drop as shown in dotted lines thereby depressing the arm 33 and the rod 20 allowing the pawl to drop and stop the machine as above described before the accumulated film can get into the machine or be otherwise damaged.

It will of course be understood that the stop pawl and ratchet may be applied to any other moving part of the machine if desired.

Having thus described my invention, what I claim and desire to secure by Letters Patent is:—

1. In a motion picture projecting machine, the combination of a frame having a projection aperture, film feeding mechanism for feeding the film across said aperture, an automatic shutter for cutting off the light from the film at the aperture when the machine is stopped, said film feeding mechanism embodying a normally rotating part, and means for stopping said machine comprising a trip member mounted to be shifted into engagement with said rotating part and an operating member for said trip positioned to be actuated by the end thrust of the film on departing from its normal path of movement.

2. In a motion picture machine the combination of a film feed mechanism comprising successive film feeding devices and operating means therefor, said mechanism embodying a normally rotating part, means for engaging and stopping said part, and means out of engagement with the film in its normal path of movement and operated by the thrust of the film on a departure from such path to actuate said stopping means.

3. In a motion picture machine the combination of a plurality of successive film feeding devices, a guide inclosing a loop of film between said devices, said guide having opposite stationary guiding surfaces for directing said film in a predetermined direction upon enlargement of said loop, and means operated by the enlargement of said loop for stopping said machine.

4. In a motion picture machine having a film feeding mechanism comprising a continuously driven sprocket, an intermittent sprocket, a second continuous sprocket beyond said intermittent sprocket and a receiving reel beyond said last mentioned sprocket, the combination of means for stopping said machine and means operated by an abnormal accumulation of film between two of said sprockets for actuating said stopping means, and means between said last mentioned sprocket and said reel for actuating said stopping means.

5. In a motion picture machine the combination of a plurality of successive film feeding devices, a guide for causing the film to be projected in a predetermined direction upon enlargement of a loop of film between such devices, said guide having opposite stationary film engaging surfaces, a movable member adjacent said loop-guiding means, and in the path of the enlargement of the loop controlled by such means, and means for cutting off the light from the film actuated by said movable member.

Signed at New York city, in the county of New York and State of New York this 15th day of February, A. D. 1913.

NICHOLAS POWER.

Witnesses:
W. B. MORTON,
R. NETTER.